No. 634,985. Patented Oct. 17, 1899.
J. R. KUNZELMAN.
RAILWAY SPIKE.
(Application filed Apr. 6, 1899.)
(No Model.)
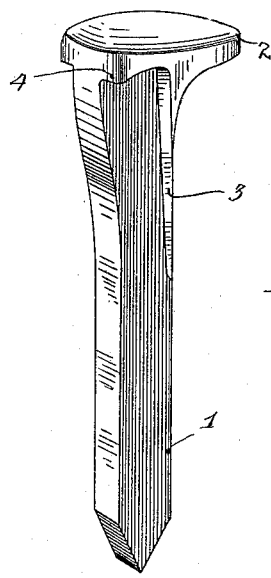
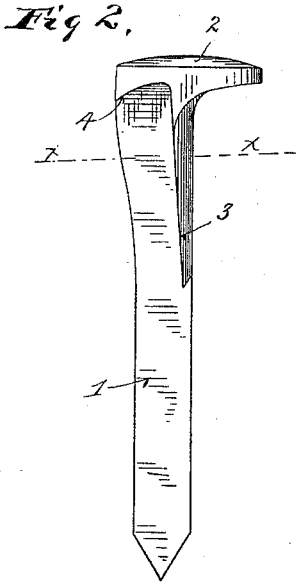
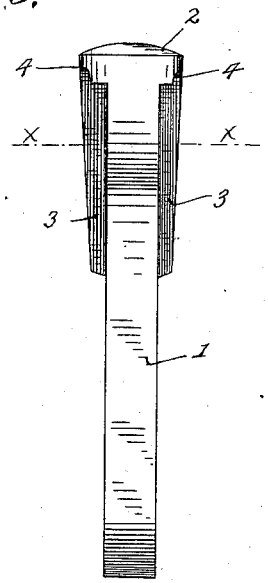
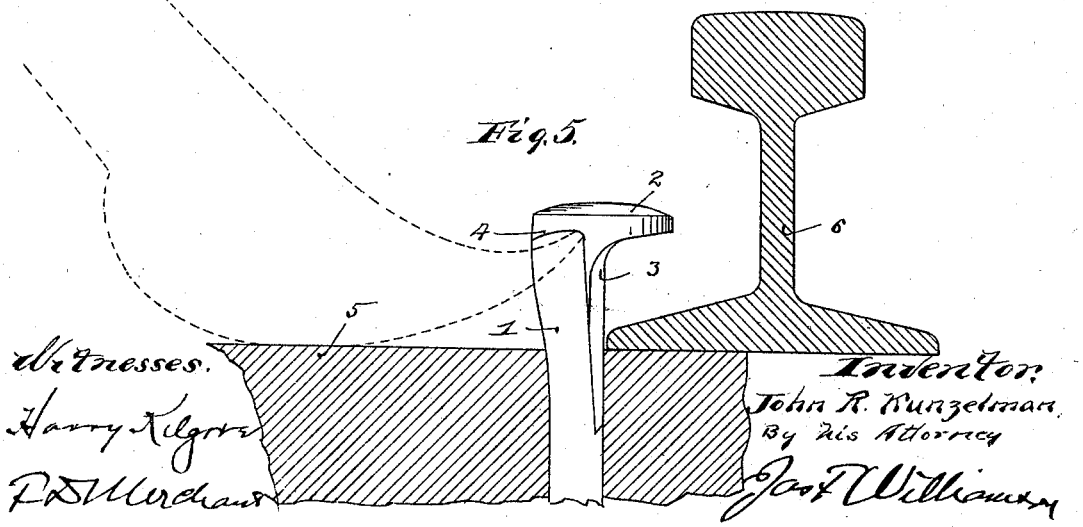
Witnesses.
Harry Kilgore
P. D. Merchant
Inventor:
John R. Kunzelman,
By his Attorney
Jas. T. Williamson
THE NORRIS PETERS CO., PHOTO-LITHO., WASHINGTON, D. C.

UNITED STATES PATENT OFFICE.

JOHN R. KUNZELMAN, OF STILLWATER, MINNESOTA.

RAILWAY-SPIKE.

SPECIFICATION forming part of Letters Patent No. 634,985, dated October 17, 1899.

Application filed April 6, 1899. Serial No. 711,907. (No model.)

*To all whom it may concern:*

Be it known that I, JOHN R. KUNZELMAN, a citizen of the United States, residing at Stillwater, in the county of Washington and State of Minnesota, have invented certain new and useful Improvements in Railway-Spikes; and I do hereby declare the following to be a full, clear, and exact description of the invention, such as will enable others skilled in the art to which it appertains to make and use the same.

My invention relates to railway-spikes, and has for its object to provide a spike having certain features of improvement with a view of increased efficiency.

To this end my invention consists in the novel method of producing the spike hereinafter described and in the spike having the novel features hereinafter described, and defined in the claims.

My improved spike is illustrated in the accompanying drawings, wherein like notations refer to like parts throughout the several views.

Figure 1 is a view of the spike in perspective. Fig. 2 is a side elevation of the same. Fig. 3 is a rear elevation of the same. Fig. 4 is a cross-section on the line $x\,x$ of Figs. 2 and 3; and Fig. 5 is a view, chiefly in section, but partly in elevation, with some portions broken away and others shown in diagram only, illustrating the spike as it appears when being withdrawn from working position.

The numeral 1 represents the body or shank of the spike, and 2 represents the head of the same. The shank of the spike is shown as of rectangular form in cross-section, pointed at its lower end, and bulged outward or backward to afford an increased body of stock at the junction of the head and the shank at the back of the spike. The spike is also provided with lateral flanges 3 on its face or rail side, which flanges extend downward from the head 2 to a distance less than the full length of the shank 1. As shown, the said flanges 3 are of a length less than one-half the length of the spike-shank. The said flanges 3 are knife-edged at their sides and at their lower ends, as clearly appears in Figs. 1, 2, and 3. The said flanges 3 have backs which are of concave form in cross-section, as clearly appears in Fig. 4. The flanges of the head 2 are also of concave form on their under surface from front to rear at that portion of the same extending outward from the flanges 3 to the back of the spike, as shown at 4 in Figs. 1, 2, 3, and 5.

The numeral 5 represents a tie, 6 a rail, and 7 a claw in dotted lines, shown as in the act of drawing the spike.

In forming the spike the flanges 3 are upset from the same body of stock which is upset to form the head of the spike. Hence a part of this stock so upset is extended outward to form the head-flanges, and another part is forced downward to form the said lateral flanges 3. The lateral flanges 3 are therefore upset forgings continuous with the body of the spike-head 2. The purpose of the lateral flanges 3 and the purpose of making the same by the method just described is to reinforce the spike at what has hitherto been the weakest point— to wit, at the face junction of the shank and the head on the rail side of the spike. When the spike is formed in the old way without lateral flanges 3 and with the head upset to afford its lateral head-flanges, the spike is always extremely weak at that point where the face or rail flange of the head projects from the shank. By employing the lateral flanges 3 continuous with the head on the face or rail side of the spike an increased body of stock is afforded at the junction of said flanges with the head, and as this is part of the metal upset with the metal upset to form the head, as described, there can be no flaw at the point above named, and hence the spike is rendered extremely strong at the point desired with economy in metal. In addition to this reinforcement of the spike at the junction of its head and shank on the rail side of the spike, as described, the said flanges 3 also afford, of course, an increased surface for taking hold of the wood when driven home into the tie 5. Moreover, as the said flanges 3 are formed concave at their backs in cross-section, as shown in Fig. 4, they will take hold of the stock in the tie in such a way that when the spreading strain comes onto the spike from the rail 6 the wood engaged between the sides of the spike and the concave surfaces of the flanges 3 will be compressed against said sides, thereby greatly increasing the bite of the spike on the wood of the tie. The fact that the lateral flanges 3 are knife-edged at their sides and lower ends renders the spike easy to drive.

The purpose of the undercut or concave surface in the portions of the head-flanges, as shown at 4, is to afford a good hold for the claw 7 when using the same to withdraw the spike, as shown at Fig. 5.

A spike of the form herein shown and constructed as herein described is one which is easy to manufacture and one wherein the maximum strength is secured with a minimum of stock. Hence the spike is cheap to make, which is a necessary feature for commercial success.

What I claim, and desire to secure by Letters Patent of the United States, is as follows:

1. A railway-spike comprising a head with overhanging sides, and a body having lateral flanges on its face or rail side, which flanges are continuous with the sides of the head, are approximately the full width of said spike-head and extend downward from the head to a distance less than the full length of the spike, substantially as described.

2. A railway-spike comprising a head with overhanging sides, and a body having lateral flanges on its face or rail side, which flanges are knife-edged at their sides and lower ends, and which flanges are continuous with the sides of the spike-head, are approximately the full width of said spike-head and extend downward therefrom to a distance less than the full length of the spike, substantially as described.

3. A railway-spike comprising a head with overhanging sides, and a body having lateral flanges on its face or rail side, which flanges are upset continuous downward extensions from the sides of the spike-head, are the full width of said spike-head, and are of wedge shape with the head of the wedge terminating in the head of the spike, whereby the spike is greatly strengthened at the face junction of its head and shank, substantially as described.

4. The railway-spike substantially as herein shown and described, comprising the body portion 1, the head 2, the lateral flanges 3 on the face or rail side of the spike, which said flanges are of wedge shape, with the head of the wedge terminating in the head of the spike, and which spike-head is provided with the undercut or concave surfaces 4, all substantially as and for the purposes set forth.

In testimony whereof I affix my signature in presence of two witnesses.

JOHN R. KUNZELMAN.

Witnesses:
M. M. McGeary,
Jas. F. Williamson.